United States Patent [19]

Dechantsreiter

[11] 4,358,239

[45] Nov. 9, 1982

[54] WAREHOUSE CRANE INCLUDING INCLINABLE TOTE PAN PULLER

[75] Inventor: Max J. Dechantsreiter, Milwaukee, Wis.

[73] Assignee: Harnischfeger Corporation, West Milwaukee, Wis.

[21] Appl. No.: 191,142

[22] Filed: Sep. 26, 1980

[51] Int. Cl.³ .............................................. B61B 10/02
[52] U.S. Cl. .................................. 414/661; 414/259; 414/282; 198/748; 74/89.21
[58] Field of Search ............... 414/239, 240, 241, 259, 414/246, 282, 661; 74/37, 89.21, 89.2; 198/748, 740, 732; 104/172 R, 172 C

[56] References Cited

U.S. PATENT DOCUMENTS

| | | | |
|---|---|---|---|
| 1,065,746 | 6/1913 | Swanson | 198/748 |
| 3,237,789 | 3/1966 | Guilbert | 414/661 |
| 3,529,481 | 9/1970 | Budzyn | 74/89.21 |
| 3,632,001 | 1/1972 | Richens | 414/661 |
| 3,883,008 | 5/1975 | Castaldi | 414/661 |
| 4,070,972 | 1/1978 | Folsom | 414/259 |

Primary Examiner—Trygve M. Blix
Assistant Examiner—D. W. Keen
Attorney, Agent, or Firm—James E. Nilles

[57] ABSTRACT

A warehouse crane comprises an elevationally positionable carriage, a shuttle guidably mounted on the carriage for transverse movement, and apparatus for moving a tote pan out of storage racks alongside either side of the crane and onto the carriage, the crane further being able to replace the tote pan in its original compartment or to place the tote pan in any other compartment in either of the storage racks. The apparatus for moving the tote pan out of a storage rack includes a pair of reversibly driven endless chain mechanisms mounted on the shuttle and a tote pan puller attached to those chain mechanisms. The puller travels in a horizontal and flat orbital path, but changes from a vertical position to a transversely outwardly inclined position as it approaches the ends of that path so that the puller may engage a tote pan handle as it moves upwardly in an inclined position.

7 Claims, 8 Drawing Figures

WAREHOUSE CRANE INCLUDING INCLINABLE TOTE PAN PULLER

FIELD OF THE INVENTION

This invention relates generally to warehouse cranes able to retrive tote pans from individual storage areas therealong. In particular, it relates to improved tote pan handle engaging means.

DESCRIPTION OF THE PRIOR ART

Some warehouse cranes have an elevationally positionable carriage for alignment with individual storage areas and a puller for engaging a tote pan handle and moving tote pans from a storage area to the carriage and thence to the same or to any other storage area accessible by the crane. These pullers are disposed in a vertical position throughout their travel around a generally horizontal and flat orbital path. However, the prior art pullers do not by themselves move the tote pan handles into the compartments and clear of the aisles. The entire carriage tote pan support must typically be moved to clear the handle from the aisle, and movement of that much of the apparatus is cumbersome.

Secondly, prior art pullers, as they move radially along and adjacent the sprockets at the outer ends of their orbital paths in a vertical disposition, come very close to and provide very little clearance between themselves and the storage racks along the puller's entire height. A small misalignment of the puller on the sprockets or a minimal wear-out of some of the puller driving or chain-mounting components can cause striking or slapping of the puller against the aisle-facing portions of the storage racks or tote pans.

SUMMARY OF THE INVENTION

The present invention is a warehouse crane having an elevationally positionable carriage for alignment with individual storage areas, comprising a shuttle guidably mounted on the carriage for limited transverse movement, a pair of reversible driven endless chain mechanisms mounted on the shuttle, and a tote pan puller connected to each of the endless chain mechanisms and arranged for bodily travel with those chain mechanisms in a generally horizontal and flat orbital path including travel at opposite ends of that path. The puller is disposed in a generally vertical direction and has an upper free end, the arrangement of the puller endless chain mechanisms being such that as the approaches the ends of the orbital path, it moves from a vertical position to a transversely outwardly inclined position whereby its free end can engage a tote pan handle as the puller moves upwardly and in its inclined position. The crane may further include power operated extensible means connected between the carriage and shuttle to shift the latter a limited amount in either transverse direction to thereby provide additional transverse reach for the puller.

The invention has several advantages over the relevant prior art. It provides a puller which approaches in a transversely outwardly inclined position the inverted V-shaped handle of a tote tray residing in a storage compartment, thereby minimizing the chances of the puller striking or slapping the aisle-facing sides of the storage racks or tote pans. It further provides a puller which can move a tote pan and its handle from the carriage into the storage compartment without the need for moving the entire carriage tota pan support to keep a part of the handle out of the aisle. Conversely, it has this same advantage in retrieving a tote pan in a storage compartment whose handle is well clear of the aisle.

Other objects and advantages of the invention will appear hereinbelow.

DESCRIPTION OF A PREFERRED EMBODIMENT

Figure 1:
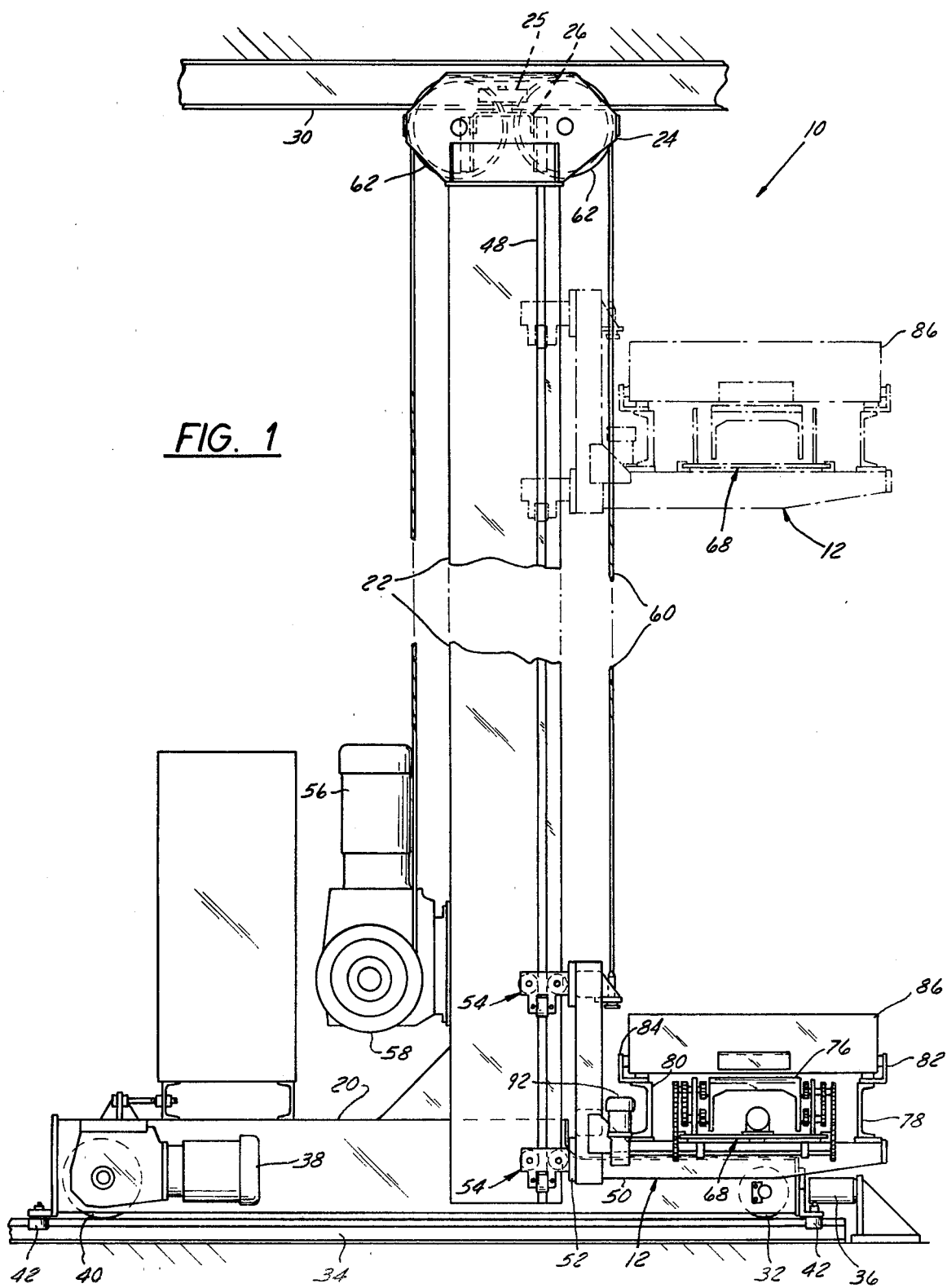
FIG. 1 is a side elevational view of a warehouse crane in accordance with the invention, the carriage being shown at its lowermost position on the mast and in phantom at an intermediate position.

The present invention comprises a warehouse crane 10 (FIG. 1) having a carriage 12 that may be positioned elevationally along that crane, and which is also movable in a horizontal direction. In this way, the carriage 12 may be moved in an aisle 14 which has on either of its sides compartmentalized storage racks 16 and 18. Typically, the racks are fabricated of steel beam structural members and two racks which are mirror images of each other are disposed opposite each other across the aisle, with the compartments arranged in horizontal rows and vertical columns.

Horizontal Crane Movement

Means are provided for moving the crane 10 horizontally along the aisle in a stable manner. The crane comprises a horizontally-extending bridge 20 fabricated of structural steel such as I-beams and which is parallel to and substantially centrally located within the aisle 14. A vertically-disposed mast 22 is rigidly attached to and extends upwardly from the bridge 20. The mast 22 supports, at its upper end, a sheave guard 24, on which is rigidly mounted a cross member 26 provided with a plurality of guide wheels 25 on vertical axes. An overhead guide rail 30 in the form of an I-beam and extending parallel to aisle 14 is mounted above the mast 22, as for example to the ceiling of the building in which the crane 10 operates, and the wheels 25 bear against the opposite sides of the vertically extending portion of the guide rail 30 to thereby serve to stabilize the crane 10 and prevent it from tipping. Bridge 20 has rotatably mounted to the right of its structure (with respect to FIG. 1) an idler wheel 32 riding on a straight rail or track 34 which extends from a home station down aisle 14 and which is parallel to aisle 14 and overhead guide rail 30 and substantially centrally located within the aisle. The home station is at one end of the aisle and comprises mechanical means for preventing the crane 10 from travelling off the end of its track 34, such means typically being a mechanical bumper stop 36 rigidly attached to the aisle floor. The bridge 20 is moved in forward and reverse directions (to the left and right directions with respect to (FIG. 1) by electric crane motor 38 which is mounted thereon and connected to a drive wheel 40 riding on track 34. Guide rollers 42 are provided on each side of the drive wheel 40 and idler wheel 32 and ride on each side of track 34 to provide lateral stability to the bridge as it moves thereon.

Carriage Movement

Figure 8:
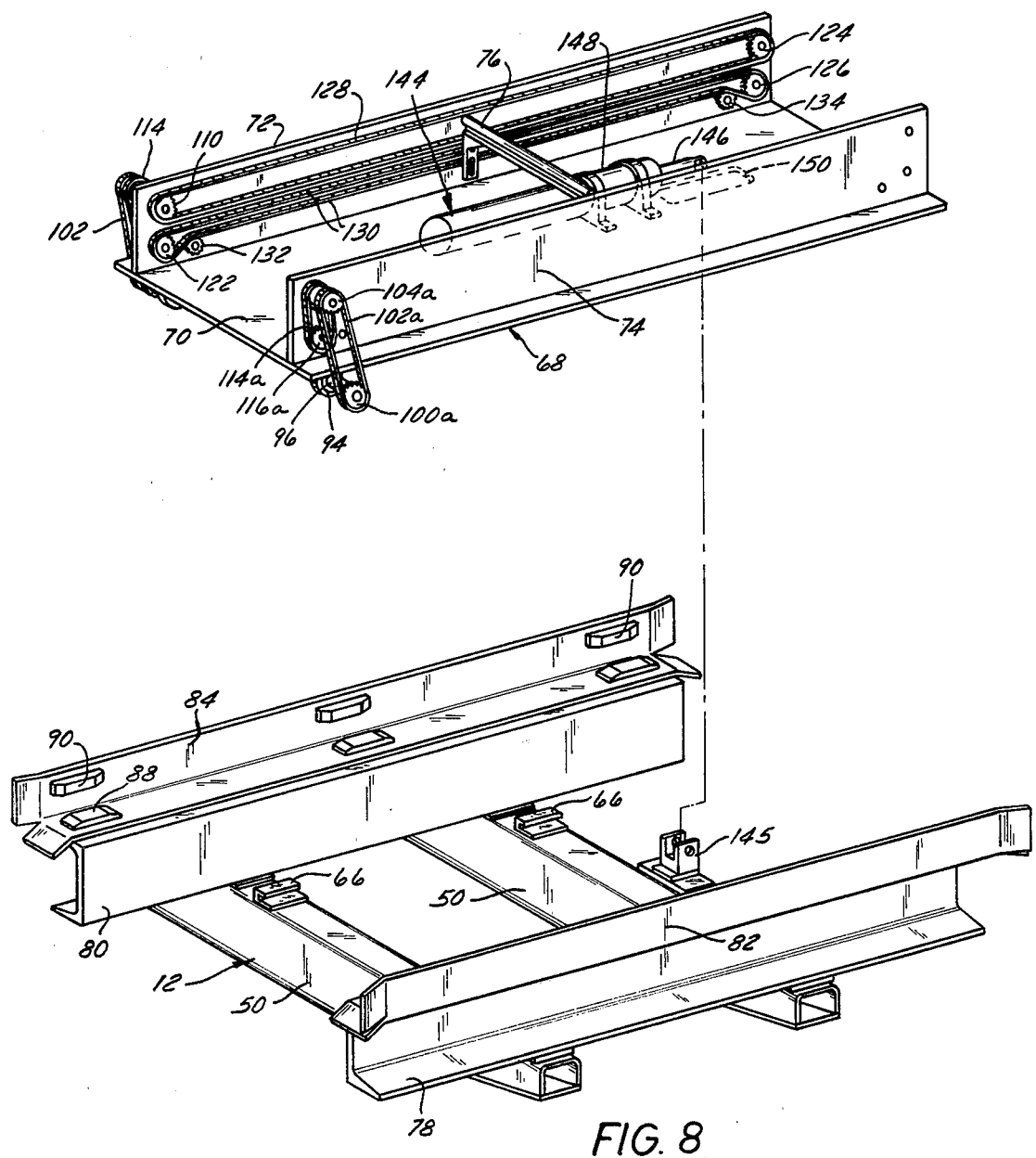
FIG. 8 is an exploded perspective view of the shuttle and carriage.

Means are provided for moving the carriage 12 vertically on the mast 22. A carriage track 48 extends vertically on both of the storage rack-facing sides of mast 22 and substantially along the mast's entire height, providing support and guidance for the vertical movement. The carriage 12 comprises a pair of horizontally-extending frame members 50. Frame members 50 have rigidly attached thereto a vertically-extending rear wall 52, but the rest of the carriage is open at its front, left, and right sides, as FIGS. 1 and 8 show. The carriage 12 is secured to and guided by the track 48 of mast 22 by a plurality of roller assemblies 54 secured to the rear wall 52 by welding or other attachment means. A hoist motor 56 is supported by mast 22 and connected to drive drum 58, which has attached thereto one end of a wire rope 60 and which further has wire rope 60 wrapped therearound. The wire rope 60 is reeved over a pair of sheaves 62 supported by and rotatably mounted within sheave guard 24 and is attached at its other end to the rear wall 52 of the carriage to thereby raise and lower the carriage upon movement of the rope 60 by the hoist motor 56 and drum 58. Control means (not shown) for the motor 56 are provided remotely, as is well known in the prior art.

Tote Pan, Tote Pan Puller, and Support Structure

Figure 3:
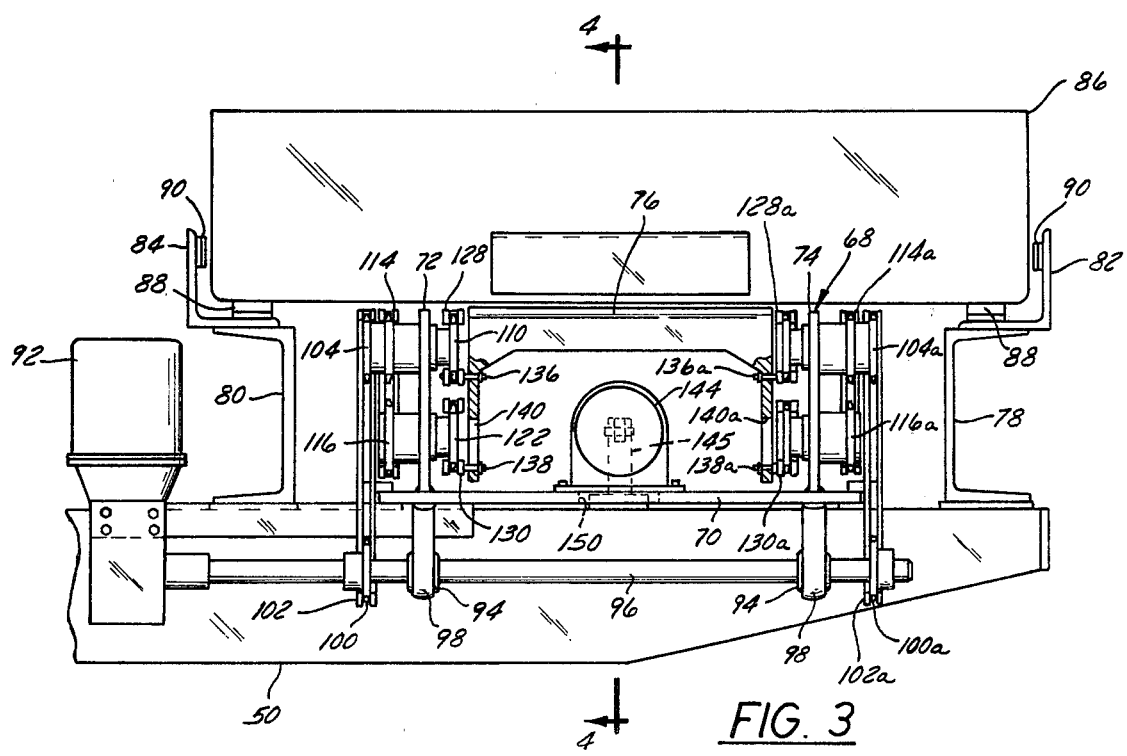
FIG. 3 is a side elevational view, on an enlarged scale, of the carriage portion of the crane shown in FIG. 1.

Means are provided for supporting a tote pan and tote pan puller, being shown generally in FIGS. 1, 3 and 8. A plurality of channel-shaped gibs or guide bearings 66 are attached to the frame members 50, and engage the shuttle 68 for limited, transverse, slidable movement of that shuttle therein. The shuttle 68 is comprised of a horizontally disposed, rectangular steel plate 70 with a length running transversely of and which is slightly less than the width of aisle 14. It is along its length that the shuttle 68 engages guide bearings 66 for movement from a centered position on the carriage in either direction (i.e., left or right with respect to FIG. 5) toward any station in the storage racks 16 and 18, respectively. Two vertical plates 72 and 74 are rigidly attached to and run the length of plate 70. Plates 72 and 74 provide support for each of a pair of reversibly driven endless chain mechanisms, as will be explained hereinbelow, which mechanisms are connected to and drive a tote pan puller 76.

Front and rear channel-shaped side rails 78 and 80 are weldably attached to the frame members 50, and have attached thereto front and rear angle members 82 and 84, respectively, with one leg of each angle member disposed in an inwardly direction and having a horizontal orientation and the other leg of each directed upward to thereby form a support structure for tote pans 86 as the tote pan puller 76 removes them from their respective storage racks and onto the carriage 12. To ensure that the pans 86 are not damaged while sliding along the angle members 82 and 84 and to reduce the power required by puller 76 to slidably move the pans along those angle members, each of the latter is provided along its horizontal leg with a plurality of nylon or other similar tote pan bottom slides 88 secured in their position by countersunk screws or bolts. The inside of each vertical leg of the angle members is faced with a plurality of nylon or other similar tote pan side guides 90 similarly secured in their positions. Angle members 82 and 84 have their ends flared open to provide guiding ramps for the tote pan to minimize the chances for damage thereto.

Tote Pan Puller Drive Means

Means are provided for moving the tote pan puller 76 transversely and along the length of shuttle 68 so as to enable the puller to engage tote pans 86 and move them transversely from a location in a storage rack to the carriage and then back to the same or to any other location in either of the storage racks 16 or 18.

Figure 4:
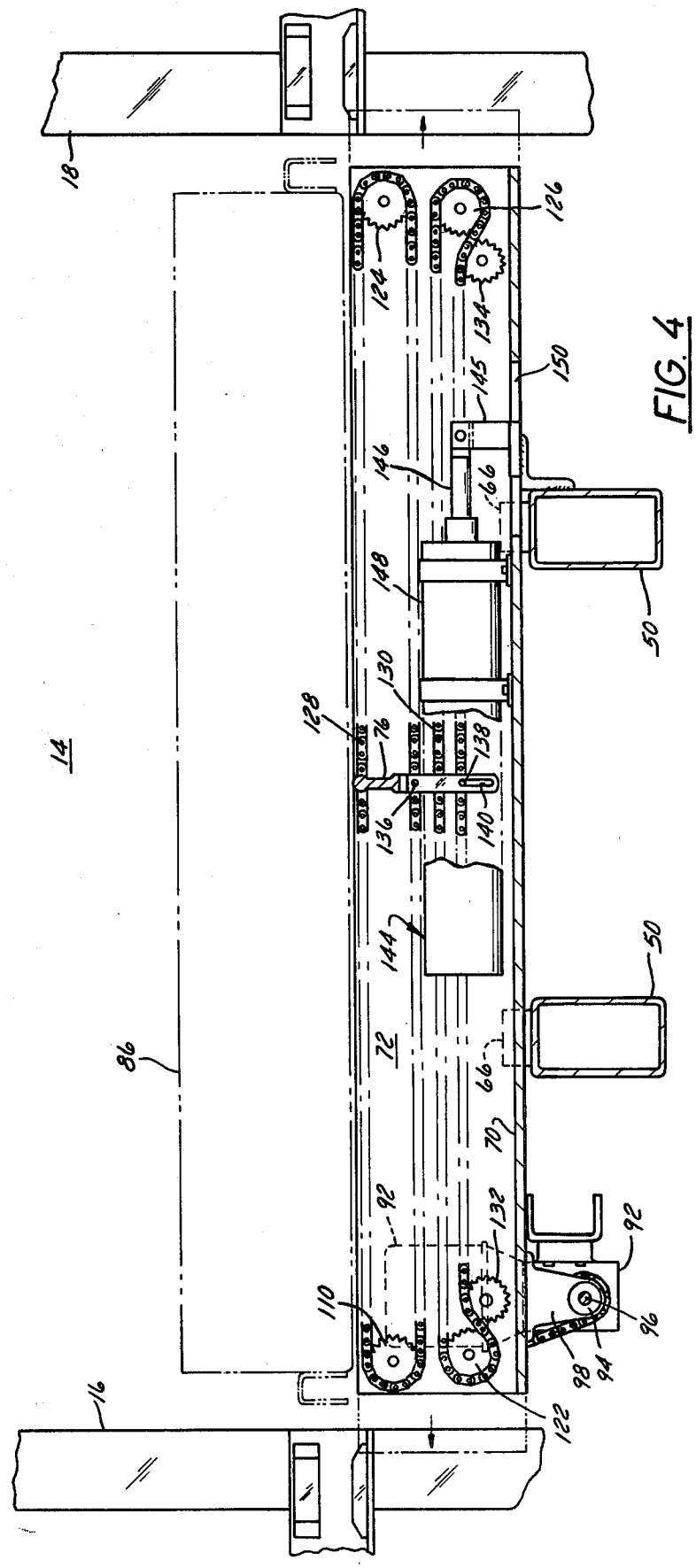
FIG. 4 is an enlarged, cross-sectional view of the carriage taking along lines 4—4 of FIG. 3.

The means include a reversible motor and gear reducer 92 fixedly attached to the lower side of steel plate 70 of shuttle 68 and movable with the latter. The motor/reducer 92 drives a cross shaft 96 rotatably mounted in bearings 94 which are also attached to the lower side of the steel plate 70 by bearing hangers 98. The cross shaft 96 drives a pair of drive sprockets 100 and 100a mounted thereon. As each of the drive sprockets is attached to similar components to thereby move puller 76 in a similar manner, only the attachment and operation of the drive sprocket and components attached thereto as shown in FIG. 4 is described, and it is understood that the other drive sprocket and components attached thereto operates as a mirror image of that in FIG. 4. The drive sprocket and components not discussed herein are identified in the figures with the same reference numbers of those discussed, bit further having the suffix "a". Each mirror image comprises a reversibly driven endless chain mechanism.

As drive sprocket 100 is rotated by cross-shaft 96, the former rotates an endless drive chain 102. The drive chain 102 in turn rotates the outer sprocket of double sprocket 104 wich is non-rotatably joined by set screw 106 to a jack shaft 108, which is in turn non-rotatably joined at its other end by a set screw to upper puller sprocket 110. This arrangement ensures that upper puller sprocket 110 rotates once for every rotation of double sprocket 104. The jack shaft 108 is supported on wall 72 by and rotatably mounted within upper bearing hub 112. The inner sprocket of double sprocket 104 rotates an endless drive chain 114, which rotates the synchronizing sprocket 116, which in turn is non-rotatably joined by set screws to an idler shaft 118. The idler shaft 118 is supported on wall 72 by and rotatably mounted within lower bearing hub 120, and is further non-rotatably joined at its other end by set screws to lower puller sprocket 122. This arrangement ensures that lower puller sprocket 122 rotates once for every rotation of synchronizing sprocket 116. As may be seen in FIG. 4, lower puller sprocket 122 is positioned inwardly of upper puller sprocket 110. On the right side of wall 72, the directions being with respect to FIG. 4, upper puller chain sprocket 124 and lower puller chain sprocket 126 are mounted in the wall 72 so that the identical upper 128 and lower puller chains 130 are oriented substantially horizontally along their lengths between sprocket 110 and sprocket 124 and between sprocket 122 and sprocket 126, respectively. Because sprocket 126 is also located inwardly of sprocket 124, the distance between sprockets 122 and 126 is less than that between sprockets 110 and 124. Thus, because chains 128 and 130 are identical in length, idler sprockets 132 and 134 are rotatably mounted in wall 72 below and inwardly of sprockets 122 and 126, respectively, and engage lower puller chain 130 to remove the slack therefrom, the slack being caused by the smaller distance between sprockets 122 and 126 as compared to the distance between sprockets 110 and 124.

The inner sprocket of double sprocket 104 and sprockets 116, 110, 122, 124 and 126 are sized so as to ensure identical linear chain speed for chains 128 and 130, as by sizing all the aforementioned sprockets with identical diameters and numbers and sizes of teeth.

Tote Pan Puller

Means are provided for engaging an inverted U-shaped handle of a tote pan 86. The right and left sides of the puller, as viewed in FIG. 3, are identically mounted to each of the tote pan puller drive means described hereinabove, one being mounted as a mirror image to the other. Thus, only one side's mounting is described below.

Figure 5:
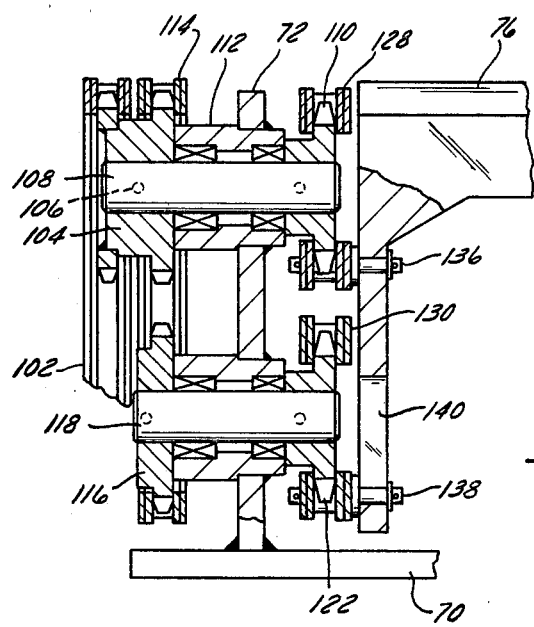
FIG. 5 is a side sectional view, on an enlarged scale, of a portion of the tote pan puller and the drive means therefor.

The tote pan puller 76 is shown in FIGS. 4 and 5 engaged to upper 128 and lower 130 puller chains and in its neutral position. As the chains rotate synchronously in either a clockwise or counterclockwise direction, the puller 76 in FIG. 4 moves to the left or right, respectively. The puller is pivotably mounted at each of its two upper ends, to chain 128 with extended pins 136 from one link of chains 128 and 128a. In addition, the lower end of puller 76 has a slot 140 and is pivotably mounted to chain 130 by extended pin 138. The pivotable mounting is necessary to permit relative movement of the chain pins and the puller 76 as the puller moves around the sprockets at the end of the chains 128 and 130 in a horizontal orbital path. The Vertical movable mounting slot 140, at the lower end of puller 76, is necessary because the distance between the respective upper flights of chains 128 and 130 is greater than the distance between the respective lower flights of those chains. As shown in FIG. 4, while the puller moves on the lower flights of the chain in its orbital path, pin 138 is in the upper portion of the slot 140 in puller 76. Movement of chains 128 and 130 in a clockwise direction causes movement of puller 76 to the left and around sprockets 124 and 126, after which the puller will be moving to the right and pin 138 will be in the lower portion of slot 140 in puller 176.

Figure 7:
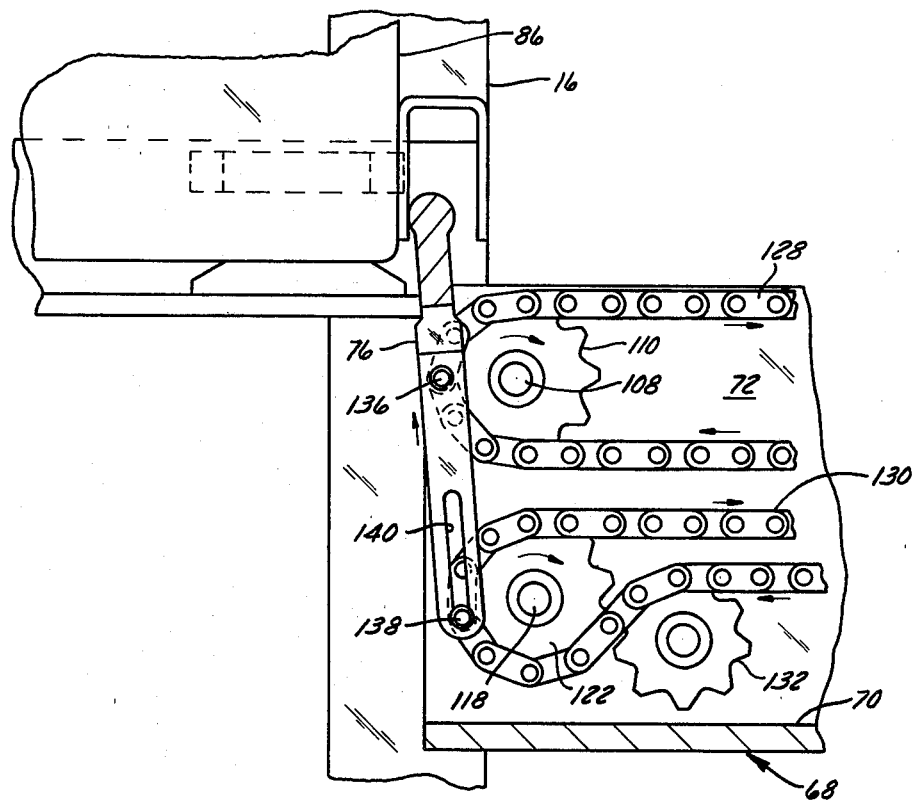
FIG. 6 and 7 are motion diagrams illustrating sequentially the movement of the tote pan puller around the sprockets at one end of its orbital path and the engagement of a tote pan handle during the inclined and upward movement of the puller.
Figure 6:
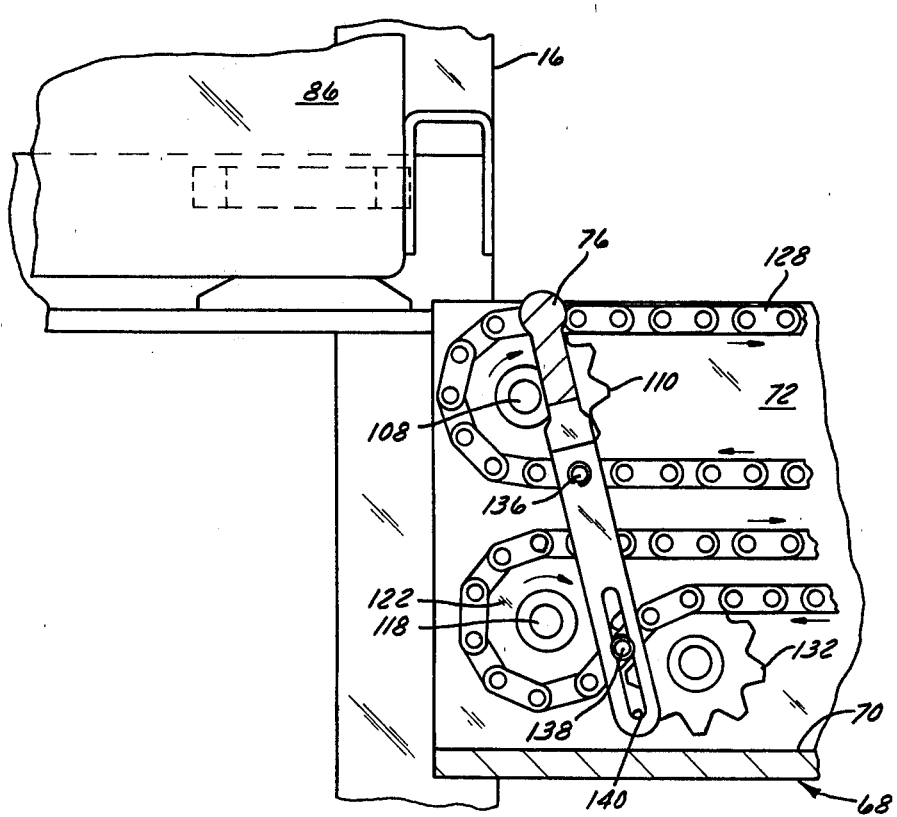

As the puller 76 reaches sprockets 124 and 126 or sprockets 110 and 122, it moves from its vertical position to a transversely outwardly inclined position whereby its upper or free end can engage a tote pan handle, as shown in the sequence FIGS. 6 and 7. To engage the inverted, U-shaped handle, the puller 76 moves in its inclined position in an upward direction.

Power Operated Extensible Means

To provide additional transverse reach for the puller so that it may cause the shuttle 68 to shift a limited amount in either transverse direction, power-operated extensible means are connected between the carriage and the shuttle.

In this embodiment, these extensible means comprise an electric piston 144 whose rod end 146 is mounted by pin means to a clevis 145 rigidly mounted on one of the frame members 50 and whose cylinder end 148 is mounted by bolt means to the steel plate 70 of shuttle 68. Because shuttle 68 is transversely slideably mounted in guide bearings 66, and because the guide bearings are fixedly attached to frame members 50, the actuation of the electric piston 144 causes limited sliding movement of the shuttle 68 in either transverse direction. While any suitable electric piston may be used, it is preferred in this embodiment that model No. SMXOI-A, manufactured by Race International, Inc., Bethel Park, Penna., be used.

As the shuttle 68 moves transversely, the tote pan puller drive means discussed above and attached to the shuttle must move with the latter. Because the clevis 145 for rod end 146 of piston 144 extends through plate 70 and is mounted to one of the frame members 50, a slot 150 must be provided in steel plate 70 to permit slideable movement of the shuttle 68 in a transverse direction.

The power-operated extensible means permit the puller to engage and inverted U-shaped handle of a tote pan 86 even when that pan is positioned within the storage racks 16 and 18 such that the handle is not extending into the aisle 14.

Operation

Figure 2:
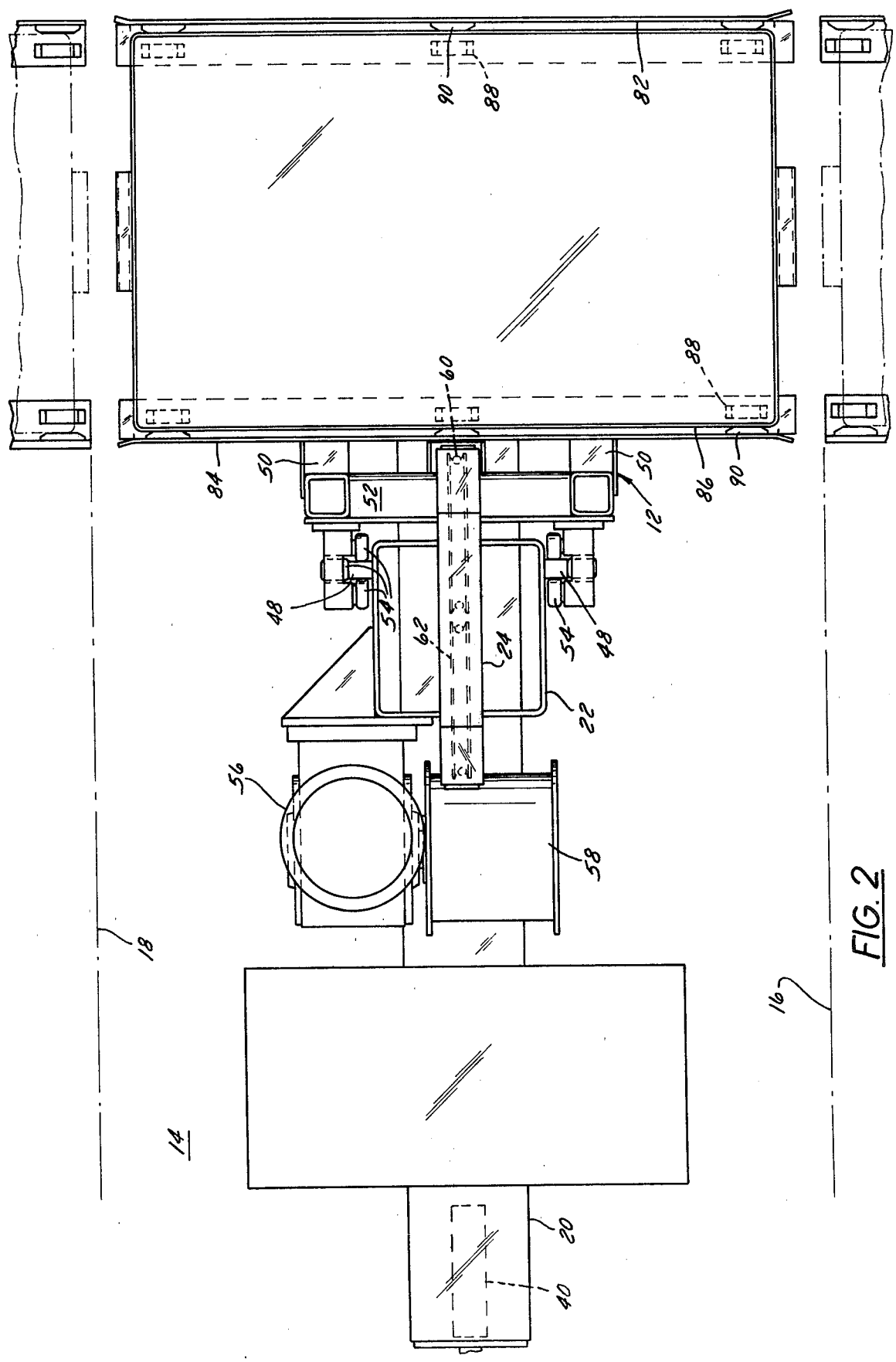
FIG. 2 is a top plan view, on an enlarged scale, of the crane shown in FIG. 1.

In the operation of the apparatus, the carriage is positioned by the warehouse crane for alignment with an individual storage area or storage compartment, as shown in FIG. 2. The tote pan puller 76 is in the neutral, vertically-disposed position shown in FIG. 4 and the electric piston is also in a neutral position as shown in that figure, i.e., not extending the cylinder towards storage rack 16 or storage rack 18. The carriage is assumed to be not engaging a tote pan, unlike the illustration of FIG. 7.

Motor and gear reducer 92 are actuated by control means (not shown) therefore to move the puller 76 to the right or left. Assuming clockwise rotation of chains 128 and 130, and thus leftward movement of puller 76, the puller will approach sprockets 110 and 122. After the puller begins its move from a vertical position to a transversely outwardly inclined position but before it begins its upward movement, the motor 92 is stopped, leaving the puller in approximately the position shown in FIG. 6. The electric piston is then extended from its position in FIG. 4, causing leftward movement of shuttle 68 in guide bearings 66 so that the free end of the tote pan puller 76 is shifted in the same direction. The motor 92 may then be restarted and the puller will be able to engage the tote pan's inverted U-shaped handle located beyond the reach of a puller not shiftable by extensible means. For this reason, pans may be placed deeper within the storage compartments and the handles extending therefrom will easily clear aisle 14.

After the upper end of puller 76 as engaged the handle of tote pan 86, the motor 92 continues to operate and thereby slides the tote pan out of its compartment in storage rack 18 and onto the carriage 12, where the pan is supported by side rails 78 and 80 and angle members 82 and 84. The tote pan is now readily accessible and one may easily remove contents therefrom or insert contents therein. The puller 76 now engages the handle nearest storage rack 16. Thus, if it is desired to replace the tote pan in the same compartment of rack 18, the motor is reversed, causing leftward movement of the puller and the pan. Placement of the tote pan into another compartment of rack 18 comprises using the crane described hereinabove to move the carriage to a position adjacent that other compartment before moving the puller to the left to slide the pan therein.

If one wishes instead to move the tote pan from its position on the carriage to compartment in storage rack 16, the crane positions the carriage adjacent the desired compartment and the puller 76 is disengaged from its handle-engaging position at the carriage by recommencing the clockwise rotation of the chains 128 and 130. The puller 76 moves downwardly and around sprockets 124 and 126, thereby releasing the handle nearest rack 18 and moves leftwardly with its upper free end below the lowest portion of pan 86 on carriage 12. As the puller continues its leftward movement, it approaches sprockets 110 and 122 and is again moved from its vertical position to a transversely outwardly inclined position whereby its free end can engage the tote pan handle nearest rack 18 as the puller moves in its inclined position and in an upward direction. After engaging that tote pan handle, the puller moves to the right to slidably shift the pan into the desired compartment of storage rack 16. The electric piston is retracted when the puller is inclined adjacent sprockets 124 and 126 to move the tote pan handle deep within the compartment and out of the aisle. Continued clockwise movement of chains 128 and 130 moves the puller back to its neutral position as shown in FIG. 4. The piston is then returned to its neutral position as shown in that same figure.

Recapitulation

The invention is a warehouse crane with a shuttle and a puller suitable for removing tote pans from their storge compartments. The puller approaches the handle with which it removes the tote tray at an inclined, transversely outward position so as to minimize the chance of a substantial portion of the puller striking the adjacent and aisle-facing storage compartments or tote tray. The crane's carriage tote pan support is fixed to the carriage and does not move with the shuttle, and less power is thus required to shift that shuttle as it is moved transversely to remove the tote pan handle from the aisle.

What I claim is:

1. In the warehouse crane having an elevationally positionable carriage for alignment with individual storage areas, a shuttle guideably mounted on said carriage for limited transverse movement, a pair of reversibly driven endless chain mechanisms mounted one above the other on said shuttle and a tote pan puller connected to each of said endless chain mechanisms and arranged for bodily travel therewith in a generally horizontal and flat orbital path including travel at opposite ends of said path, said puller being disposed in a generally vertical direction and having an upper free end, the arrangement of said endless chain mechanisms being such that as said puller approaches the ends of said orbital path, it moves from a vertical position to a transversely outwardly inclined position whereby its free end can engage a tote pan handle as said puller moves in its inclined position and in an upward direction.

2. The crane set forth in claim 1 further characterized in that said endless chain mechanisms include a first pair of transversely spaced apart sprockets, endless chain trained around said sprockets, a second pair of transversely spaced apart sprockets located beneath said first pair and inwardly thereof, a second chain trained around said second sprockets, said chains being of equal length, idler sprockets for said second chain and disposed to maintain the latter taut, said puller being connected to each of said chains.

3. The crane set forth in claim 1 further including power operated extensible means connected between said carriage and said shuttle to shift said shuttle a limited amount in either transverse direction to thereby provide additional transverse reach for said puller.

4. The crane set forth in claim 2 further characterized in that said endless chain mechanisms include a first pair of transversely spaced-apart sprockets, an endless chain trained around said sprockets, a second pair of transversely spaced apart sprockets located beneath said first pair and inwardly thereof, a second chain trained around said second sprockets, said chains being of equal length, idler sprockets for said second chain and disposed to maintain the latter taut, said puller being connected to each of said chains.

5. The crane set forth in claim 3 further characterized in that said puller is connected to said first endless chains by pivotable pin means, and is further connected to said second endless chains by a second pivotable pin means vertically movable in a slot in said puller.

6. The crane set forth in claim 4 further characterized in that said puller is connected to said first endless chains by pivotable pin means, and is further connected to said second endless chains by a second pivotable pin means vertically movable in a slot in said puller.

7. In the warehouse crane having an elevationally and horizontally positionable carriage for alignment with individual storage areas, a shuttle including a tote pan puller and guidably mounted on said carriage for limited transverse movement in either transverse direction to thereby provide additional transverse reach for said puller; power operated extensible means connected between said carriage and said shuttle to shift said shuttle in said transverse directions; a pair of reversibly driven endless chain mechanisms mounted on said shuttle, said chain mechanisms including a first pair of transversely spaced apart sprockets, an endless chain trained around said sprockets, a second pair of transversely spaced apart sprockets located beneath said first pair and inwardly thereof, a second chain trained around said second sprockets, said chains being of equal length, idler sprockets for said second chain and disposed to maintain the latter taut; a tote pan puller connected to each of said chains and arranged for bodily travel therewith in a generally horizontal and flat orbital path including travel at opposite ends of said path, said puller being disposed in a generally vertical direction and having an upper free end, the arrangement of said endless chain mechanism being such that as said puller approaches the ends of said orbital path it moves from a vertical position to a transversely outwardly inclined position whereby its free end can engage a tote pan handle as said puller moves in its inclined position and in an upward direction; to thereby enable transverse movement of said tote pan by said tote pan puller; a pair of horizontally disposed and spaced apart tote pan guides fixedly mounted to said carriage for guiding movement of said tote pans while being pulled transversely onto said carriage by said puller and for supporting said tote pans during horizontal and elevational movement thereof by said carriage; said tote pan puller being connected to said first endless chains by pivotable pin means, and further connected to said second endless chains by a pivotable pin means vertically movable in a slot in said puller; and drive means for said reversibly driven endless chain mechanisms, comprising a gearmotor driving a crossover shaft, said crossover shaft supported by said carriage and beneath said shuttle to drive a pair of driven sprockets attached thereto, said driven sprockets enagaged to drive chain and sprocket means for rotation of each of said endless chain mechanisms so as to ensure identical linear chain speed for each of said mechanisms.

* * * * *